United States Patent [19]

Smith, Jr.

[11] Patent Number: 4,857,728
[45] Date of Patent: Aug. 15, 1989

[54] METHOD AND APPARATUS FOR REDUCING RADIOACTIVE HAZARDS IN WELL BOREHOLES

[75] Inventor: Harry D. Smith, Jr., Houston, Tex.

[73] Assignee: Halliburton Logging Services Inc., Houston, Tex.

[21] Appl. No.: 200,227

[22] Filed: May 31, 1988

[51] Int. Cl.⁴ .............................................. G01V 5/04
[52] U.S. Cl. ................................ 250/260; 250/256; 250/269; 250/496.1
[58] Field of Search ........... 250/269, 260, 256, 496.1, 250/493.1, 432 R; 166/376, 255, 250; 175/45, 40

[56] References Cited

U.S. PATENT DOCUMENTS

| | | | |
|---|---|---|---|
| 3,515,871 | 6/1970 | Johnson, Jr. et al. | 250/269 |
| 3,766,388 | 10/1973 | Greaney | 250/266 |
| 4,421,982 | 12/1983 | Potter et al. | 250/260 |

FOREIGN PATENT DOCUMENTS 1321739  6/1973  United Kingdom ................ 250/260

Primary Examiner—Constantine Hannaher
Attorney, Agent, or Firm—William J. Beard

[57] ABSTRACT

In logging operations in a well borehole where difficulties arise in retrieval of the logging apparatus, drilling through the logging tool is sometimes necessary. This disclosure sets forth a radioactive source material which permits this remedial step. The radioactive source material is either a short half life radioactive isotope or is in fluid form. In fluid form, it is purged out of the sonde by means of a motor controller triggered into operation to operate a piston and cylinder pump arrangement. The outlet from the cylinder is through a flow line and check valve. The purged radioactive source material is then flushed to the bottom of the well borehole and is ideally forced into a selected formation for disposal, thereby safely removing the radioactive materials from the sonde to permit destruction of the sonde.

24 Claims, 2 Drawing Sheets

METHOD AND APPARATUS FOR REDUCING RADIOACTIVE HAZARDS IN WELL BOREHOLES

BACKGROUND OF THE DISCLOSURE

After a well has been partly or totally drilled, various open hole or cased hole logs are made in the well. One or more different types of logging tools may be incorporated on a common logging cable. Several logging tools utilize radioactive sources to implement measurements in an open or cased hole. The radioactive source is typically an encapsulated selected isotope. The isotopes are selected for a number of factors, one typical factor being to provide a particular radiation emission. Moreover, an isotope which has a relatively long half life provides essentially a constant source so that calibration of the equipment is fixed by virtue of the fact that the radiation level is essentially constant. A very common source material is $Cs^{137}$ having a half life of 30.23 years.

The relatively long half life $Cs^{137}$ isotope is advantageous in several regards, one mentioned and another being the energy of its gamma ray emissions. However, one distinct disadvantage of this isotope and others of significant long half life is the difficulty that arises when the logging equipment becomes stuck in the well borehole. Assume for descriptive purposes that a tool including a $Cs^{137}$ isotope radiation source is stuck and the tool can not be retrieved. One remedial possibility is drilling through the stuck logging tool. This is not desirable because it regrettably converts the logging tool into metal shavings which include shreds of the radioactive isotope. Since the half life is 30.23 years, the shredded materials will remain significantly radioactive for a long time, thereby preventing drilling through the stuck logging tool. If that situation arises, it is often necessary to re-enter the well and deviate the well above the stuck radioactive logging tool, or to completely abandon the well, both costly alternatives.

The method and apparatus of the present disclosure overcomes difficulties associated with $Cs^{137}$ radiation sources. The present disclosure sets forth a radioactive source which is a liquid enclosed within a container surrounded by appropriate shielding material wherein the container can be selectively emptied of the liquid radioactive material. The radioactive isotope is thus used in liquid form, secured within a cylinder and pressurized by a motor driven piston. An outlet passage cooperative with a check valve system is included to evacuate the chamber. In the event the tool can not be retrieved, the liquid incorporating the radioactive isotope is controllably forced from the tool, and then purged into the borehole in the vicinity of the tool. Additional fluid can then be introduced at the well head to flush the radioactive isotope liquid into permeable zones below the stuck tool, or to the very bottom of the well, or alternatively, through perforations of the well into selected sands. In any event, the radioactive material is evacuated from the area of the stuck tool and is transferred to a location where it poses no problem to subsequent drilling through the stuck logging tool and subsequent production work.

One type of source employed could be a liquid form of conventional isotope such as $Cs^{137}$, however a preferred alternative would be to use a radioactive isotope material having a relatively short half life. As noted above, $Cs^{137}$ half life is measured in years. The preferred alternative material for the present invention is a short half life radioactive material. Appropriate isotopes include $I^{131}$ which has a half life of 8.07 days or $Au^{198}$ which has a half life of 2.693 days. If either of these isotopes is used, the radioactive isotope material in the logging tool may quickly decay to a nonhazardous state or can be dispersed into zones adjacent the borehole or into circulating fluid in the well. Alternatively, these radioactive materials can be in liquid form and purged in the described fashion to the lower portions of the well so that the radioactive materials offer no impediment to drilling through the stuck logging tool. If the short half life radioactive were short enough, it might even be possible to allow either removal option i.e., permitting the tool to either be drilled through with the radioactive material in place in the logging tool or, alternatively, purged to a remote safe location in the borehole.

One of the features of the present disclosure is the use of a fluid isotope which is received in the apparatus within a closed chamber which isotope can be controllably evacuated by means of a motorized pump. The evacuation apparatus includes a flow line from the apparatus including a check valve, and an outlet passage from the tool so that radioactive source material can be timely evacuated. This can be used in conjunction with apparatus at the well head for introducing additional fluid flow into the well borehole to purge the radioactive source material to the bottom regions of the well borehole for disposal. In conjunction with alternative relatively short half life radioactive source materials, this apparatus provides a logging tool (e.g., a density logging tool) radioactive source to provide the required radiation intensity level for operation of the logging tool(s) and which tool, in the event of being stuck, can either be drilled through with safety or alternatively, which source will quickly decay to sufficient low levels that safety hazards are not created. The preferred apparatus includes control means for selectively operating a motor for forcing the radioactive source material out of the tool for downhole purging.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
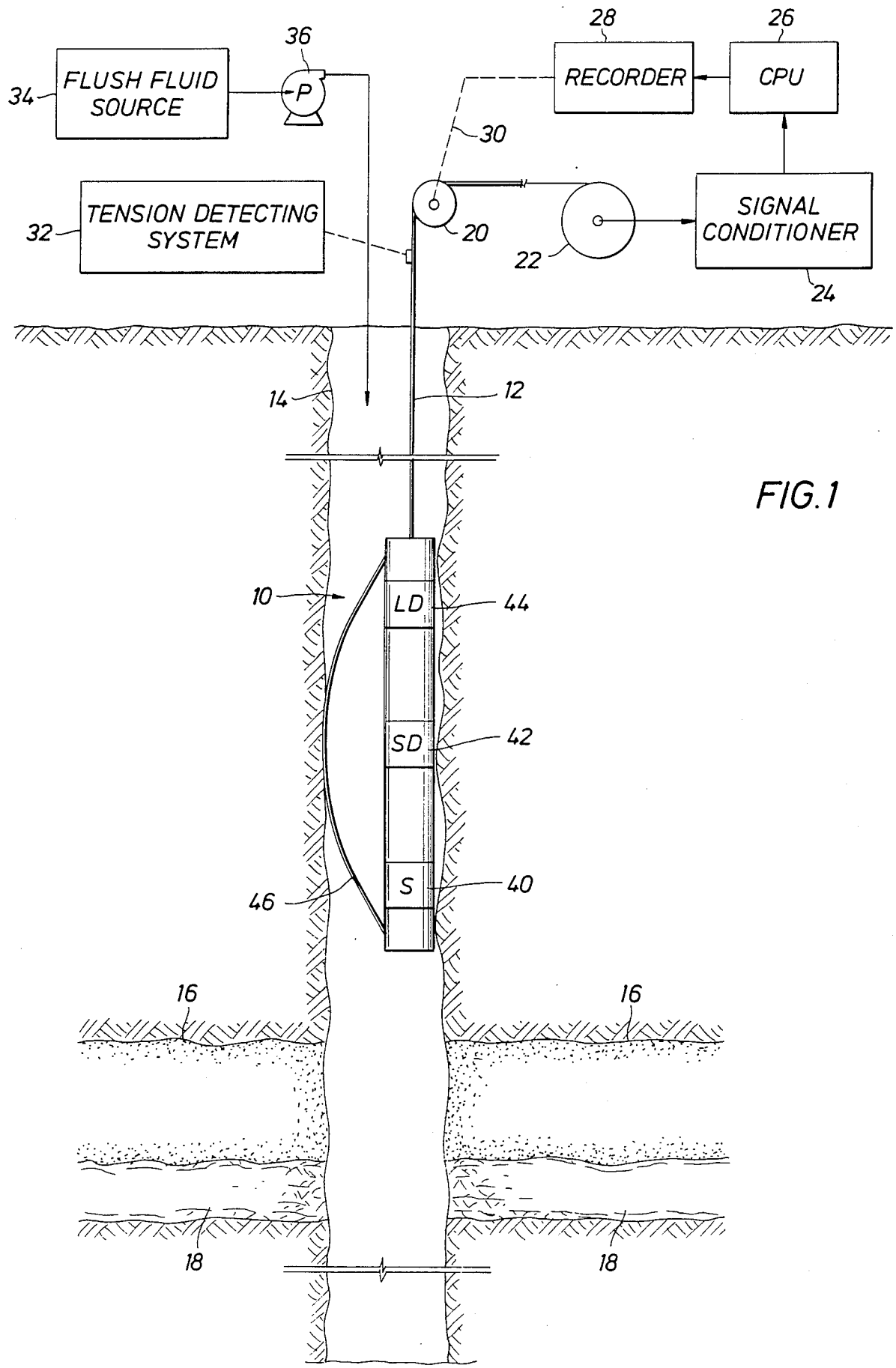
FIG. 1 discloses a radioactive logging tool suspended in a well borehole wherein surface located equipment includes means for determining that the logging tool has been stuck and a flush fluid source with pump for washing purged radioactive source material downhole.

Attention is first directed to FIG. 1 of the drawings where a logging tool 10 is suspended on a well logging cable 12 in a well 14 to conduct logging operations. The well can be open hole or cased from the surface with conductor pipe or other lengths of pipe to various intermediate depths. The logging tool 10 is any type of logging tool which utilizes a radioactive source material to provide radiation such as gamma ray radiation for operation of the logging tool. The logging tool 10 is normally constructed in the form of a sonde which encloses the logging tool, and indeed, more than one tool can be placed in a common sonde so that multiple tools are supported on the logging cable 12. Several logging tools in the sonde could utilize radioactive sources.

Typically, the well 14 will pass through various formations, one being represented at 16 above a deeper formation 18 which is permeable and therefore able to accept fluid. Well fluid under pressure can flow from the well 14 into the formation 18. For purposes of description of the present procedure, it is desirable to use the permeable formation 18 to enable purging of the radioactive source material in the fashion to be described. Alternatively, the well 14 can be sufficiently deeper below the tool 15 that radioactive fluid to be described is forced or flows to the bottom of the well and out of harm's way.

The logging cable passes over a sheave wheel 20 and is spooled on a drum 22. The cable (several thousand feet in length) is supplied from the drum 22. The cable encloses one or more conductors which are connected with a signal conditioner 24. That provides various signals from the logging tool 10 to a computer 26. The signals relate to various physical measurements of formation properties as will be exemplified below. The data from the logging tool 10 is recorded by the recorder 28, and to this end an electrical of mechanical depth measuring apparatus 30 typically connected with the sheave 20 provides depth measurements to the recorder 28. The data, being in the form of one or more traces as a function of depth, is typically recorded in strip chart form or on film as a function of the tool depth in the well borehole 14.

The equipment located at the surface also includes a tension detecting system 32. This detects tension on the logging cable 12 indicative of snagging or sticking of the logging tool. It is possible that the logging tool will be snagged or stuck at some location in the well and can not be retrieved. Another possibility is that the logging cable 12 may break for some reason and drop the logging tool toward the bottom. In either case, the tension detecting system 32 provides an indication that the logging tool can not be retrieved. Absent the system 32, if power is applied to the drum 22 in an attempt to retrieve the logging tool 10 which can not be retrieved, this is an indication that the tool is hung and remedial measures have to be undertaken. Sometimes, the cable 12 is accidentally severed, the tool 10 is dropped to the bottom of the well. Fishing operations in the well are then undertaken to retrieve it. However, if it can not be easily fished out of the well 14, it may then be necessary to drill through the logging tool so that the well can be opened up. Probably, the most common problem is sticking the sonde in an uncased hole. Tension on the cable 12 verifies that the sonde 10 is stuck. In that instance, it is expedient to initially purge the sonde prior to detaching the cable 12 from the sonde to retrieve the cable from the well. Ideally, the sonde is drilled through only after the isotope is purged and the valuable cable is retrieved. The cable is ordinarily connected to the sonde with a disconnectable (weak) link permitting pull apart release. If the cable is snagged, a cable cutting tool is used to cut the cable above the snag to recover most of the cable.

The steps of clearing the well of the stuck sonde may include utilization of a flush fluid source 34 delivered through a pump 36 which forces the fluid down the well 14 under sufficient pressure to conduct radioactive source materials away from the tool 10 and into the formation 16 or to other areas of the bottom of the well. Typically, the flush fluid is a light weight drilling fluid. It typically is drilling fluid having a reduced barite content and is thin for relatively easy fluid penetration into the formation 16.

The tool 10 exemplified in FIG. 1 incorporates a source 40, a short detector 42 and a long spaced detector 44. The tool is forced to the side by a bow spring 46 or by a backup arm which is hydraulically operated, typical of a conventional open hole formation density logging tool. Briefly, the source 40 provides gamma radiation which is directed into the formation where the radiation is scattered so that some radiation is detected by detectors 42 and 44, thereby forming output signals. The operation of compensated (two detector) formation density logging systems utilizing gamma ray sources is well known. This disclosure is directed to an improved radioactive source for use in the illustrated density tool or other tools utilizing radioactive sources.

Figure 2:
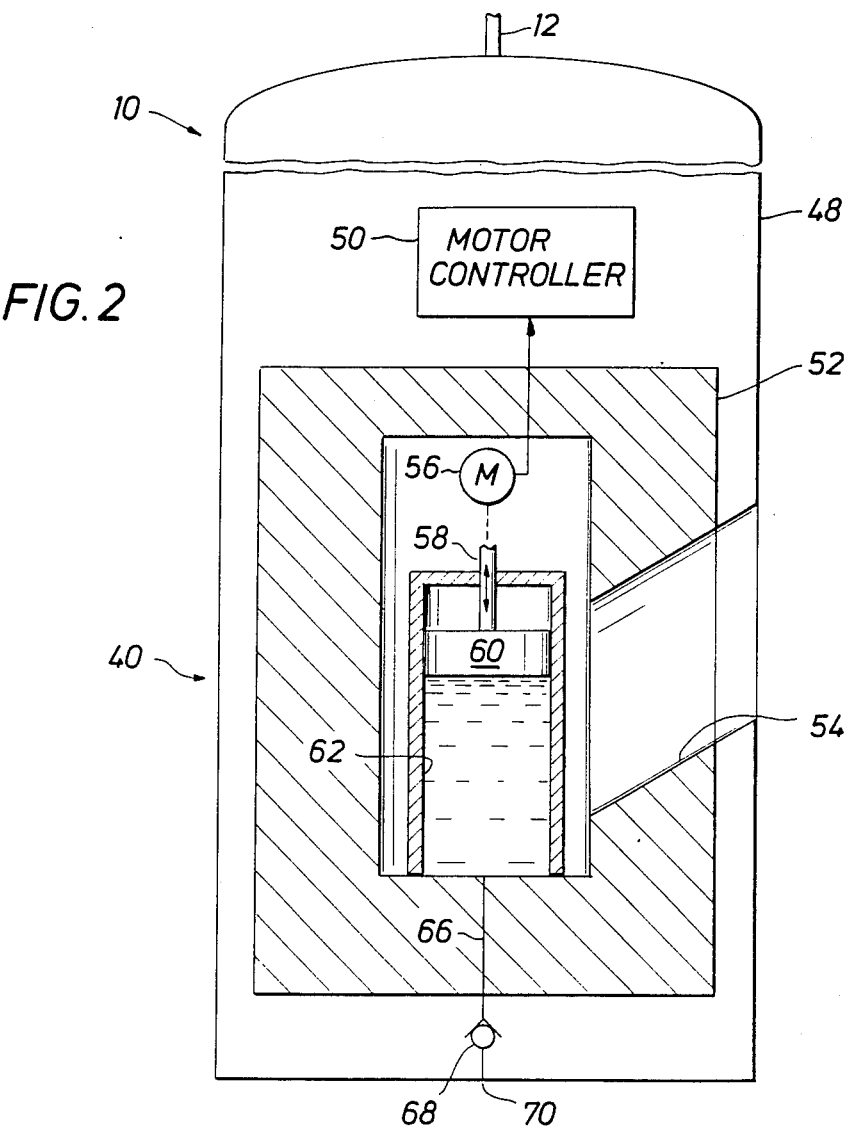
FIG. 2 of the drawings discloses a radioactive source comprised of liquid received in a cylinder and housed within shield material including a window for directing radiation from the source for operation of the radioactive logging tool.
Figure 3:
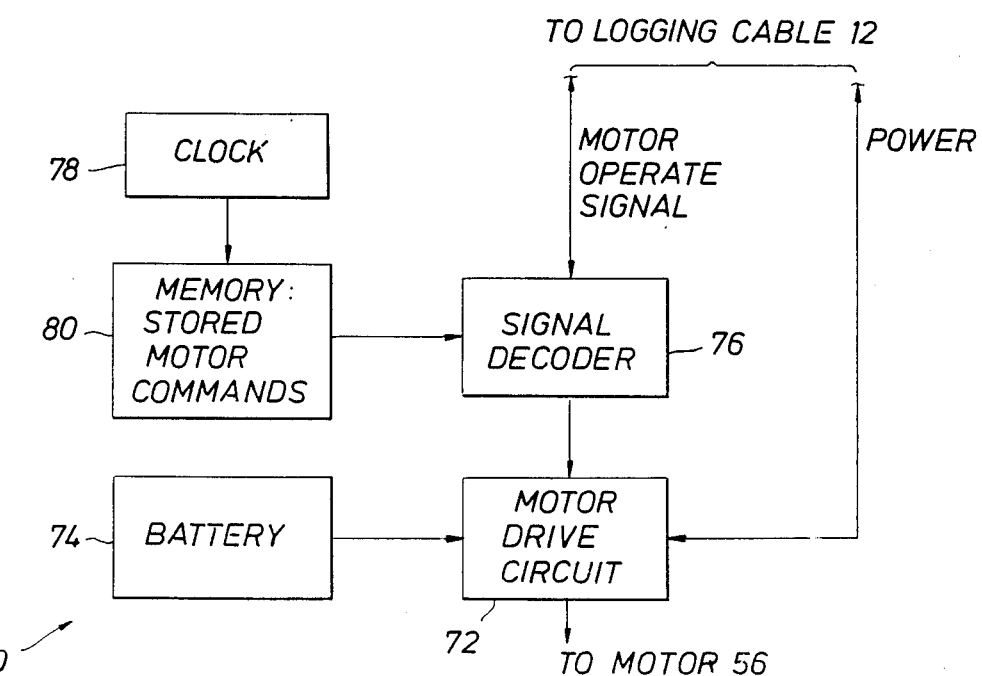
FIG. 3 is a schematic block diagram of circuit components involved in operation of a motor to assure purging of radioactive source materials.

Attention is now directed to FIG. 2 of the drawings which shows the radiation source 40 in greater detail. There, the sonde 10 will be observed to include an elongate housing or shell 48 which is typically a fluid tight housing enclosing the various components shown in FIG. 2. This housing encloses a motor controller 50 which will be described with respect to FIG. 3 of the drawings. The source is enclosed within a high density shielding material 52, such as tungsten. The shielding material preferably surrounds an internal cavity except that a window or port 54 may be formed to direct radiation to the exterior. The window provides a collimator for directing gamma radiation from the source 40 through the shell and into the adjacent formation. The window in conjunction with the shield material 52 directs a time invariant radiation pattern toward the adjacent formation to carry out the logging procedure. The radiation intensity decreases as a function of the isotope half life of the isotope used as the gamma ray source.

Three types of radiation sources may be selected for use in implementing the present invention. One source utilizes a fluid containing a conventional source isotope. The shield material 52 includes an internal hollow cavity enclosing a motor 56 which is powered selectively by the motor controller circuit 50. The motor 56 is appropriately connected by suitable mechanical means, such as a rack and pinion gear, to a piston rod 58. The piston rod reciprocates a piston 60 in the interior of a cylinder 62. The cylinder 62 is filled with a radioactive isotope source fluid or liquid to be described. The fluid or liquid volume in the cylinder 62 can be forced out of the cylinder through a flow line 66 connected with a suitable check valve 68. There is an outlet opening 70 at the lower end of the sonde. The outlet opening 70 opens directly into the well below the sonde for disposal. The piston 60 is moved to the top end of the chamber 62 and a radioactive isotope in the form of a fluid or liquid is placed in the chamber 62 to fill the chamber. Long isotope half life, ease of fluid handling, and familiarity with the source characteristics are significant factors in the choice of such a source.

A second source type would include intermediate half life sources which might be more amenable to incorporation into a fluid carrier, or where half life is not long enough to prevent gamma ray log interpretation in zones of purging in subsequent workover operations (months or years later). The half life of these sources would be long enough, however, such that source changeout in the field (after decay to substandard levels) would have reasonable frequency. One such isotope might be $Sc^{46}$, which has a half life just under three months. A third type of source material for the radioactive isotope is a short half life isotope which is defined as an isotope with a half life of about ten days or less. In this instance, the half life preferably is significantly less than the time interval that the drilling contractor can afford to wait before drilling through the logging tool. The isotope half life is preferably less than the maximum time the drilling contractor can wait to drill through the tool, such that the source could either be purged or drilled out safely, or some combination of the two.

The radioactive source material (a gamma ray emitting radioactive isotope) can be chemically bonded in a liquid or fluid material. For instance, one short half life suitable isotope is $I^{131}$ and another is $Au^{198}$. Iodine more readily chemically combines in simple metal salts which can dissolve in water or in other solvents to define a liquid for liquid storage in the source 40. Gold is readily converted into salts which enter into solution easily. Alternatively, particles of the isotope are optionally coated with a thermosetting plastic to define a particulate fluid so that a slurry is thereby obtained, the slurry supporting the radioactive isotope particles. In this instance, it is desirable that the particles be relatively small and flow as a fluid so that they can flow out of the chamber 62 and can be purged into the formation 16 below the stuck logging tool 10. It is not uncommon to inject proppants into sand formations; the particle size of the proppant describes an appropriate particle size for the isotope particles. For all radioactive sources, initial calibration is required. While this remains true for long half life isotopes including cesium, it is important to record the date and time when calibrating short or intermediate half life sources such as iodine or gold. When using short half life isotopes, the elapsed time of measurement affects the effective source strength during the logging operation, since the source actively decays as an exponential function of time. In many instances, especially if absolute counting rates are utilized in the logging operation, this decrease in source activity between calibration and logging must be compensated for prior to interpreting the measured count rate data. This can be done using techniques common in the art by "normalizing" the source strength back to calibration levels using an elapsed-dependent exponential factor.

In summary, the isotope is selected to provide the desired radiation to the formation for the type of logging service involved. Also, the isotope is selected to provide the desired half life (long or short) and preferably has a chemical compound form enabling a liquid or particulate fluid (of a flowable nature) to be stored subject to controlled purging. The sonde is preferably purged by pumping the source fluid into the well to enable subsequent drilling through the sonde without radiation hazards.

The sonde is supported on the logging cable 12 which must be removed from the sonde prior to drilling through the tool. This could be performed intentionally in a pulling out operation; it is also possible to sever the cable accidentally; the drawings show a detailed description of the motor controller 50 capable of operating with or without the cable intact. Conductors of logging cable 12 are utilized to provide power input to a motor drive circuit 72. The circuit provides electrical power to the motor 56, causing the motor to operate. In the unlikely event that the logging cable 12 is accidentally severed, it is still desirable to operate the motor drive circuit 72. To this end, a sonde battery 74 is also incorporated. It provides power as an alternate source for operation of the motor 56. Another conductor extending along the logging cable 12 provides a motor operate signal which is input to a signal decoder 76. This circuit converts the motor operate signal into a signal switching on the motor drive circuit 72 so that the motor is operated.

The motor controller 50 includes a clock 78. It is connected to a memory which stores motor commands, this component being identified at 80. When the clock provides the necessary interval measurement, a sequence of motor command signals is retrieved from the memory means 80 and is delivered to the signal decoder 76. As will be understood, this signal is preferably identical to the signal which is provided through the logging cable 12. The motor command signal from the means 80 or the command signal from the surface triggers operation of the motor drive circuit 72 and that in turn operates the motor.

Consider an example of operation of the clock 78 and the motor commands. Assume that it is arbitrarily determined that the passage of 48 hours of time as measured by the clock 78 is indicative of a stuck logging tool. Assume in this instance that the motor operation signal can not be provided over the logging cable 12. The clock 78 is set to zero when the tool is first placed in the well. If the tool is still in the well when 48 hours has elapsed, a signal is provided from the stored motor commands at 80 and input to the signal decoder 76. That signal is recognized by the signal decoder 76 which in turn initiates operation of the motor drive circuit 72 to drive the motor 56.

The motor 56 forces the piston 60 downwardly to force the radioactive source material out of the chamber 62. When the piston moves downwardly, the liquid or fluid in the chamber is forced out of the chamber, overcoming the one-way check valve 68 and any external pressure which surrounds the sonde. This apparatus will expel the radioactive source material even where there is substantial back pressure. Even if the ambient downhole pressure is 10,000 psi, the pressure in the chamber will exceed this and force the fluid out of the chamber. It is then purged from the sonde and flows downhole. If the hole is open to fluid flow, the purge fluid, depending on fluid density, may flow toward the bottom of the well. Moreover, the logging tool 10 is typically at such an elevation, even when stuck, that several thousand feet of open hole may be located therebelow. The volume of radioactive fluid is not large; the fluid is thus spread over a substantial length of well borehole. Alternatively, the flush fluid source 34 (such as drilling mud) connected to the pump 36 provides fluid pumped past the tool to wash and purge the radioactive fluid further into the well. Most of the fluid can be forced into a permeable formation as exemplified in FIG. 1 of the drawings. It may be necessary to supply considerable pressure from the surface to cause the fluid to enter a formation if most of the formations in the well have low permeability or contain a impermeable mudcake. It may even be necessary to pressure up to a pressure in excess of the pressure required to induce fracturing into one or more downhole zones. In any event, the pumping equipment for this capacity will either be at the wellsite or can be brought to the wellsite to enable completion of the flushing operation.

AN EXAMPLE OF OPERATION

Assume that the radioactive source in the tool 10 is a liquid including an iodide salt. Assume also that the logging tool 10 is stuck at 10,000 feet in the well and further assume that the formation 16 is 2,000 feet therebelow. Assume also that the flush fluid is water with NaCl which can be safely forced into the formation 16 because it is a salty artesian sand. Assume further that all efforts at retrieval of the logging tool 10 have failed. Assume the cable 12 is still connected.

In these circumstances, the motor controller 50 enables the motor 56 to be operated in a sequence for purging the radioactive source. A signal is provided on the logging cable to initiate operation of the motor 56 through the signal decoder 76. Alternatively, should the cable be broken or otherwise fail to operate by providing motor drive signals, the clock 78 will count the requisite interval and provide a signal for delivery of the stored motor commands. The motor drive circuit will operate and the motor will force the radioactive source out of the cylinder 60. A purge fluid will then be introduced into the wellbore at the surface to assist in flushing the radioactive material out of the borehole and into permeable zones or into induced or natural fracture zones.

After the tool and wellbore have been purged of the radioactive source, remedial procedures can be implemented in the well, namely, drilling through the stuck tool 10. This can be done without apprehension regarding the risk otherwise noted with long life radiation sources such as the typical encapsulated $Cs^{137}$ radioactive isotope.

While the foregoing is directed to alternate embodiments of the radioactive source for a logging tool as set forth herein, the scope is determined by the claims which follow.

I claim:
1. A logging tool adapted to be used in a well borehole for obtaining measurements by irradiation from a radioactive source, comprising:
   (a) an elongate logging tool body adapted to be lowered into a well borehole;
   (b) a radioactive source in said body for forming radiation enabling a logging activity to be conducted in the well borehole, said source having a half life of less than about 10 days and comprising a radioactive isotope of iodine or gold; and
   (c) wherein said radioactive source is carried within an enclosure means.
2. The apparatus of claim 1 wherein said isotope is enclosed in shielding means.
3. The apparatus of claim 2 wherein said shielding means surrounds said isotope and incorporates a window directing radiation from said isotope through said window.
4. The apparatus of claim 3 wherein said isotope is in fluid form in a container means, and is enclosed within said tool body within said shield means.
5. The apparatus of claim 4 wherein said tool body encloses a piston in a cylinder to enclose said fluid.
6. The apparatus of claim 5 including a flow passage from said cylinder passing through a check valve to control flow from said cylinder.
7. The apparatus of claim 5 including motor means for moving said piston to pump fluid from said cylinder.
8. The apparatus of claim 7 including motor controller means in said body operable independent of connection from said body to the surface.
9. The apparatus of claim 1 and wherein the use of a radioactive source having a half life sufficiently short that extended use thereof creates a significant time dependent decay in the logging tool source strength and said apparatus further includes means for mathematically correcting for the exponential radioactive source decay between the time at which source calibration occurs in a well logging operation and the time at which the logging measurements are made.
10. A logging tool adapted to be used in a well borehole for obtaining measurements by irradiation from a radioactive source, comprising:
   (a) and elongate logging tool body adapted to be lowered into a well borehole;
   (b) a radioactive source in said body for forming radiation enabling a logging activity to be conducted in the well borehole; and
   (c) wherein said radioactive source is formed of a fluid radioactive isotope within an enclosure means.
11. The apparatus of claim 10 wherein said isotope is enclosed in shielding means.
12. The apparatus of claim 11 wherein said shielding means surrounds said isotope and incorporates a window directing radiation from said isotope through said window.
13. The apparatus of claim 11 wherein said enclosure means comprises a piston in a cylinder to enclose said fluid isotope.
14. The apparatus of claim 13 including a flow passage from said cylinder passing through a check valve to control flow from said cylinder.
15. The apparatus of claim 14 including motor means for moving said piston to pump fluid from said cylinder.
16. The apparatus of claim 10 and further including a radioactive source having a half life sufficiently short that extended use thereof creates a significant time dependent decay in the logging tool source strength and means for mathematically correcting for the exponential radioactive source decay between the time at which source calibration occurs in a well logging operation and the time at which the logging measurements are performed.
17. A method of logging a well borehole which comprises the steps of:
   (a) placing a radioactive source in a sonde to be lowered into a well borehole;
   (b) lowering the sonde into the well borehole to conduct logging operations therein wherein the logging operations are subject to failure preventing retrieval of the sonde;
   (c) sensing a failure in the logging operations wherein retrieval of the sonde is not permitted; and
   (d) purging the radioactive source from the sonde.

18. The method of claim 17 wherein the step of purging includes pumping the radioactive source out of the sonde in fluid form.

19. The method of claim 17 including the step of purging the radioactive source into permeable or fractured zones adjacent the borehole.

20. The method of claim 18 including the further step of pumping a purge fluid from the surface of the well borehole thereinto to thereby flush the radioactive source fluid down the well borehole.

21. The method of claim 20 including the step of applying pressure to the purge fluid and the radioactive source fluid to thereby force fluid flow into a specified formation.

22. The method of claim 17 including the step of using a radioactive source having a half life sufficiently short that extended use thereof creates a significant time dependent decay in the logging tool source strength, and including the further step of mathematically correcting for this exponential radioactive source decay between the time at which source calibration occurs and the time at which the logging measurements are made.

23. The method of claim 23 wherein the source is an isotope having a half life of less than about 10 days.

24. The method of claim 17 wherein the radioactive source is a fluid, and including the step of placing the fluid in a container in the sonde.

* * * * *